United States Patent
Ettel et al.

(10) Patent No.: US 9,756,155 B2
(45) Date of Patent: Sep. 5, 2017

(54) HOUSING WALL

(71) Applicants: SIBERSDORF LABOR GMBH, Seibersdorf (AT); AIT AUSTRIAN INSTITUTE OF TECHNOLOGY GMBH, Vienna (AT)

(72) Inventors: Walter Ettel, Trumau (AT); Manfred Bammer, Vienna (AT); Gernot Schmidt, Bromberg (AT)

(73) Assignees: Seibersdorf Labor GmbH, Seibersdorf (DE); AIT Austrian Institute of Technology GmbH, Vienna (AT)

( * ) Notice: Subject to any disclaimer, the term of this patent is extended or adjusted under 35 U.S.C. 154(b) by 0 days.

(21) Appl. No.: 14/907,194

(22) PCT Filed: Jul. 4, 2014

(86) PCT No.: PCT/AT2014/050154
§ 371 (c)(1),
(2) Date: Jan. 22, 2016

(87) PCT Pub. No.: WO2015/010147
PCT Pub. Date: Jan. 29, 2015

(65) Prior Publication Data
US 2016/0165018 A1 Jun. 9, 2016

(30) Foreign Application Priority Data
Jul. 24, 2013 (AT) .............................. A 50467/2013

(51) Int. Cl.
*H04M 1/02* (2006.01)
*H01Q 1/24* (2006.01)
*H01Q 7/00* (2006.01)
*H04R 1/02* (2006.01)
*H01Q 1/40* (2006.01)
(Continued)

(52) U.S. Cl.
CPC .............. *H04M 1/02* (2013.01); *H01Q 1/243* (2013.01); *H01Q 1/40* (2013.01); *H01Q 1/42* (2013.01); *H01Q 1/425* (2013.01); *H01Q 7/00* (2013.01); *H04B 1/3833* (2013.01); *H04B 5/0081* (2013.01); *H04R 1/021* (2013.01); *H04M 2250/04* (2013.01); *H04R 2499/11* (2013.01)

(58) Field of Classification Search
CPC ...... H04M 1/02; H04B 5/0075; H04B 5/0081
See application file for complete search history.

(56) References Cited

U.S. PATENT DOCUMENTS 6,546,107 B1 * 4/2003 Bohnke .................... H04R 9/02
361/818
2009/0278757 A1 * 11/2009 Ahn ..................... H01Q 13/106
343/767
(Continued)

FOREIGN PATENT DOCUMENTS

EP 1027818 A1 8/2000

*Primary Examiner* — Wesley Kim
*Assistant Examiner* — Dong-Chang Shiue
(74) *Attorney, Agent, or Firm* — Laurence A. Greenberg; Werner H. Stemer; Ralph E. Locher

(57) ABSTRACT

A housing wall for a data communications device includes a metallic and electrically conductive main body. A slotted area having a number of slots is provided in a region of the housing wall, in such a way that in a region of the slotted area the housing wall is permeable to magnetic fields for inductively coupling-in signals for wireless communication.

11 Claims, 7 Drawing Sheets

(51) Int. Cl.
*H01Q 1/42* (2006.01)
*H04B 1/3827* (2015.01)
*H04B 5/00* (2006.01)

(56) References Cited

U.S. PATENT DOCUMENTS

2012/0268343 A1* 10/2012 Yanagi .................. H01Q 1/526
 343/872
2012/0276854 A1* 11/2012 Joshi .................. A61N 1/37229
 455/73
2014/0246941 A1* 9/2014 Brockschmidt .......... H02K 3/40
 310/196

* cited by examiner

HOUSING WALL

BACKGROUND OF THE INVENTION

Field of the Invention

The invention relates to a housing wall for a data communications device having a metallic and electrically conductive main body, to a housing for a data communications device having a housing wall, and to a data communications device, in particular a cellular phone, equipped with a housing.

In principle, in the case of data communications devices, such as cellular phones or RFID readers, for example, which enable wireless data transmission on the basis of inductive coupling between the data communications device and an external device, such as an NFC device or a transponder, for example, there is the problem that such data transmission by means of inductive coupling does not function through metallic or highly electrically conductive housings, or objects, or surfaces. For this reason, data communications devices such as, for example, cellular phones having metallic housings are generally not suitable for carrying out data transmission by means of inductive coupling to an external data communications device. The reason for this is mutual induction effects on account of eddy currents that are induced in the metallic objects or surfaces of the data communications device. The alternating electromagnetic field generated by the transmitter induces eddy currents in the metallic housing of the data communications device, said eddy currents being directed in the opposite direction to their cause and thus attenuating the resulting magnetic field required for the data communication in such a way that data communication is not possible. Modern smartphones having an NFC interface therefore have a non-metallic housing or a non-metallic cover in the region of the NFC antenna, which is normally situated on the rear side of the device.

However, the use of metallic housings for data communications devices, in particular cellular phones, has various positive aspects and advantages compared with non-shielding plastics housings, particularly with regard to stability and thermal conductivity.

BRIEF SUMMARY OF THE INVENTION

Therefore, it is an object of the invention to provide a housing wall for a data communications device, in particular a cellular phone, which is substantially metallic and has the stability and thermal conductivity of metal, but at the same time is permeable for data transmission based on inductive coupling.

In the case of a housing wall of the type mentioned in the introduction, the invention achieves said object with the features of described below.

According to the invention, in the case of a housing wall for a data communications device comprising a metallic and electrically conductive main body, it is provided that a slotted area having a number of slots is provided in a region of the housing wall, such that in the region of the slotted area the housing wall is permeable to magnetic fields for inductively coupling in signals for wireless communication. This affords a simple possibility for providing data communication between an antenna arranged in the region of the housing wall and a data communications device, such as a transponder, for example, arranged on the opposite side, wherein at the same time the advantages of a metallic housing such as the high stability or the low susceptibility to interference, for example, continue to exist.

In order additionally to improve this effect, it can be provided that the slots restrict a free propagation of the eddy currents in the housing wall, said eddy currents being induced by the magnetic field generated by a coil antenna, which is located in the region of the slotted area and bears against the housing wall or lies near the housing, in such a way that wireless communication based on inductive coupling is possible between the coil antenna and a further data communications device situated on the opposite side of the housing wall.

In order additionally to avoid entry or passage of water or gas, it can be provided that the housing wall is closed with electrically non-conductive material in the region of the slotted area, and in particular comprises an insulating layer, which covers and closes the slots, wherein in particular the slotted area of the housing wall is impermeable to air or water.

Advantageous data communication through the housing wall is achieved if a coil antenna is arranged on one of its sides in the region of the slotted area.

In order further to prevent shielding of the magnetic field emitted by an antenna, it can be provided that the slotted area projects beyond the coil antenna.

Advantageous suppression of the mutual induction is achieved if the webs formed between the slots have a width of at most 3 mm.

An arrangement having increased mechanical stability provides for the housing wall to be constructed with at least two plies and to comprise at least a first ply and a second ply, each comprising overlapping slotted areas having slots, wherein the slots in the slotted area are arranged in a manner offset relative to one another.

In order at the same time to achieve a high mechanical stability and low suppression of the emitted magnetic field, it can be provided that an insulating layer is formed between the first ply and the second ply, said insulating layer spacing apart the two plies from one another and electrically insulating them from one another.

The mechanical stability can be improved further by virtue of the slots of the first ply and the slots of the second ply forming angles of more than 45°, in particular of more than 85°, with respect to one another.

The invention furthermore relates to a housing for a data communications device comprising a housing wall according to the invention and a coil antenna arranged in the interior of the housing and arranged in the region of the slotted area.

Furthermore, the invention relates to a data communications device, in particular a cellular phone, having a housing according to the invention.

BRIEF DESCRIPTION OF THE SEVERAL VIEWS OF THE DRAWING

A number of exemplary embodiments of the invention are illustrated with reference to the following figures of the drawings.

DESCRIPTION OF THE INVENTION

Figure 1:
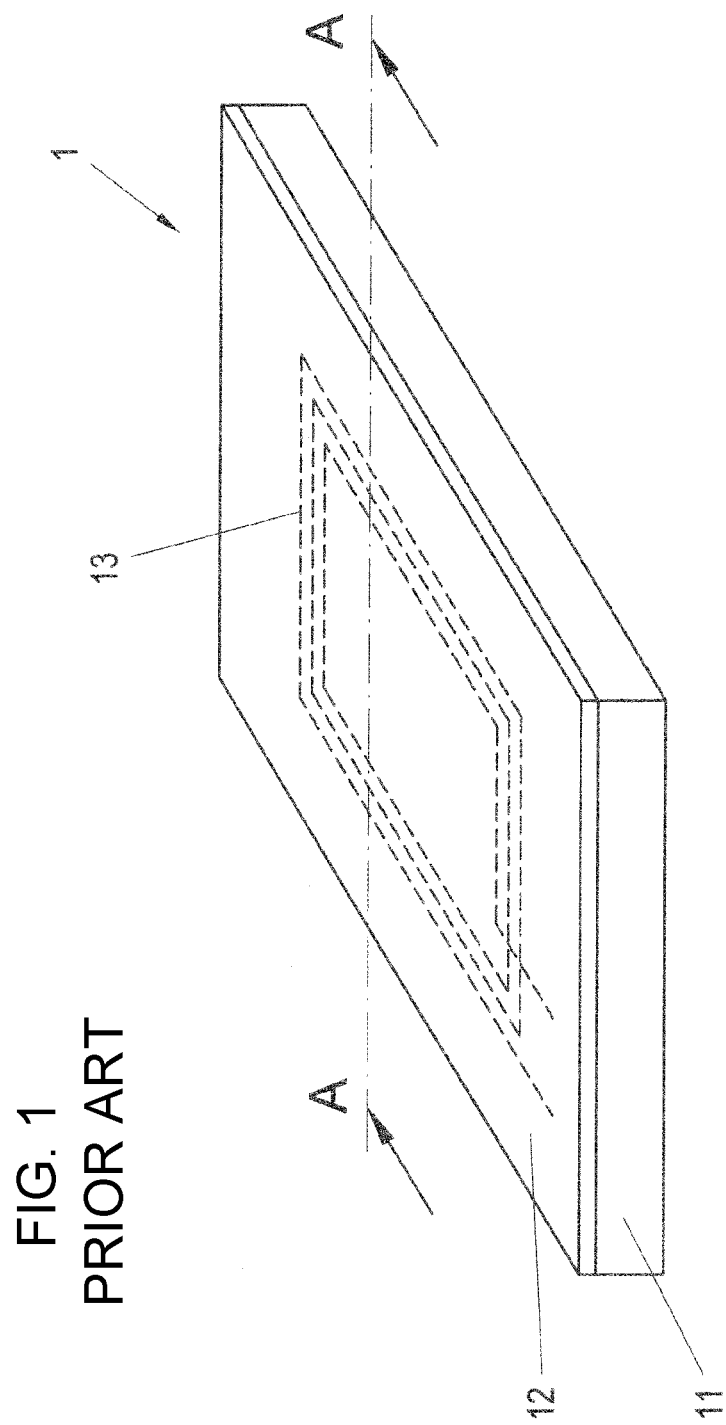
FIG. 1 shows a cellular phone having a metallic housing according to the prior art.

FIG. 1 shows a cellular phone having a metallic housing according to the prior art. In the present example, the cellular phone 1 comprises two housing parts 11, 12, namely a trough-like housing part 11 and a flat housing part 12, which when combined enclose and shield the electronics 14 (FIG. 2) of the cellular phone.

Furthermore, FIG. 1 shows an NFC antenna 13 which is connected to the electronics 14 of the mobile radio device and lies in the interior of the housing of the cellular phone 1 that is formed by the two housing parts 11, 12.

Figure 2:
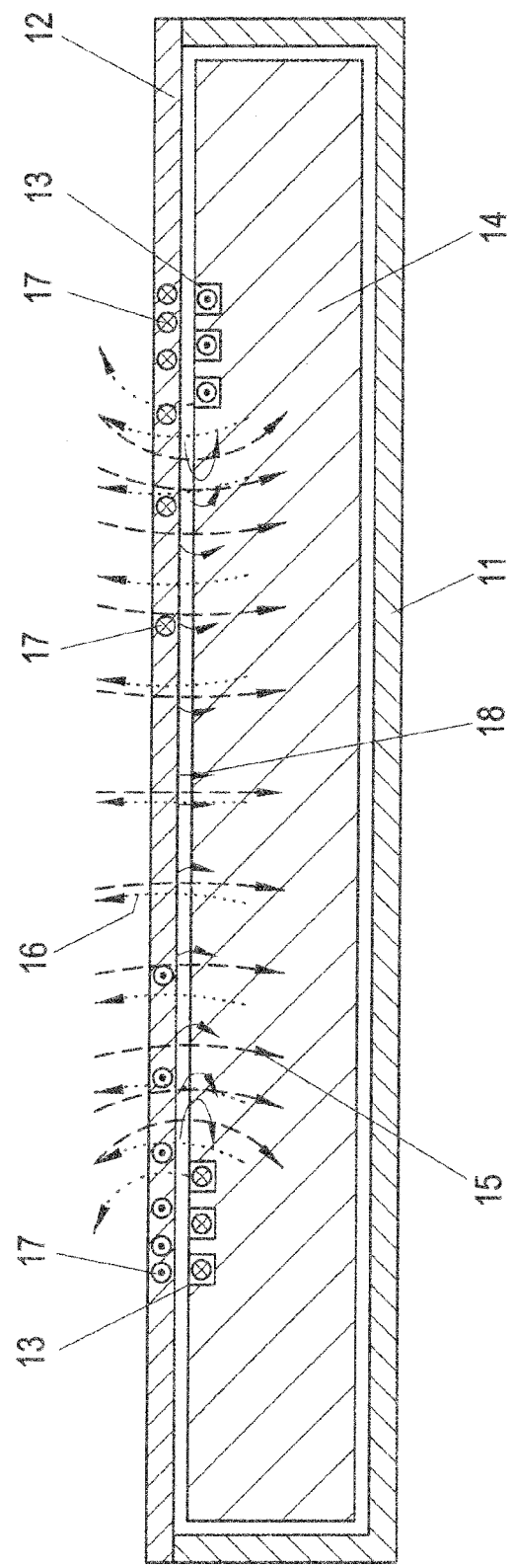
FIG. 2 illustrates a section through the cellular phone illustrated in FIG. 1.

As illustrated in FIG. 2, an electromagnetic field is generated by the antenna 13. The dashed arrows 15 represent that electromagnetic field which arises without the metallic shielding of the housing wall 12. The dotted arrows 16 show the electromagnetic field that arises as a result of eddy currents 17 induced in the housing wall 12. As a result of the superposition of the two magnetic fields 15, 16, a resulting magnetic field 18 arises which is greatly attenuated relative to the original magnetic field 15. Therefore, the range and strength of the magnetic field and of the data transmission which is possible by means of NFC proceeding from the cellular phone 1 is significantly reduced.

In order to achieve the aim of a resulting magnetic field sufficient for inductive communication outside the cellular phone housing, the formation of eddy current induction can be suppressed. With materials that are currently technically available, it is not possible to reduce the electrical conductivity of the material of the device housing rear wall without at the same time also losing many (thermal) advantages of a metallic device housing rear wall.

Figure 3:
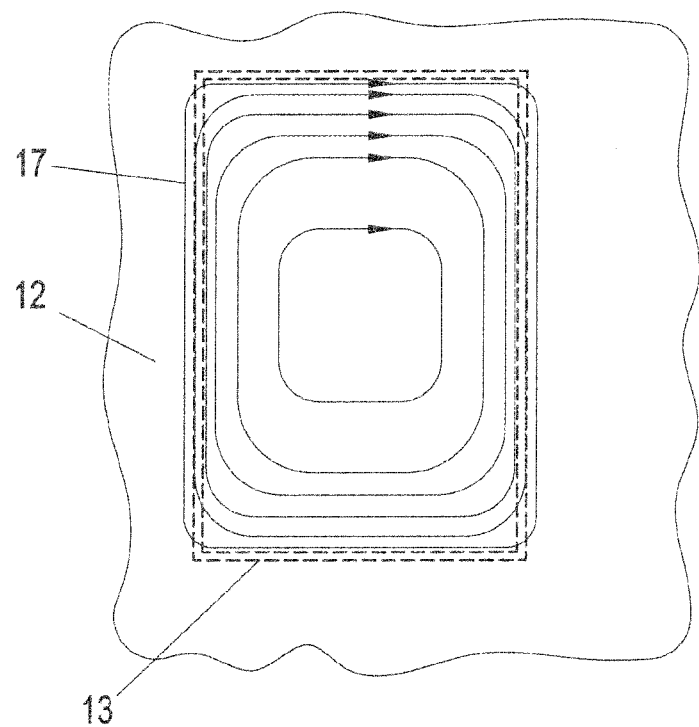
FIG. 3 shows the formation of eddy currents in a fully metallic housing wall.

FIG. 3 illustrates in greater detail the effect of the current displacement in the housing wall 12 of the cellular phone 1 illustrated in FIGS. 1 and 2. It should be noted that the eddy currents that form, owing to the effect of the current displacement, are concentrated along the edge of the metal surface permeated by the magnetic field.

Figure 4:
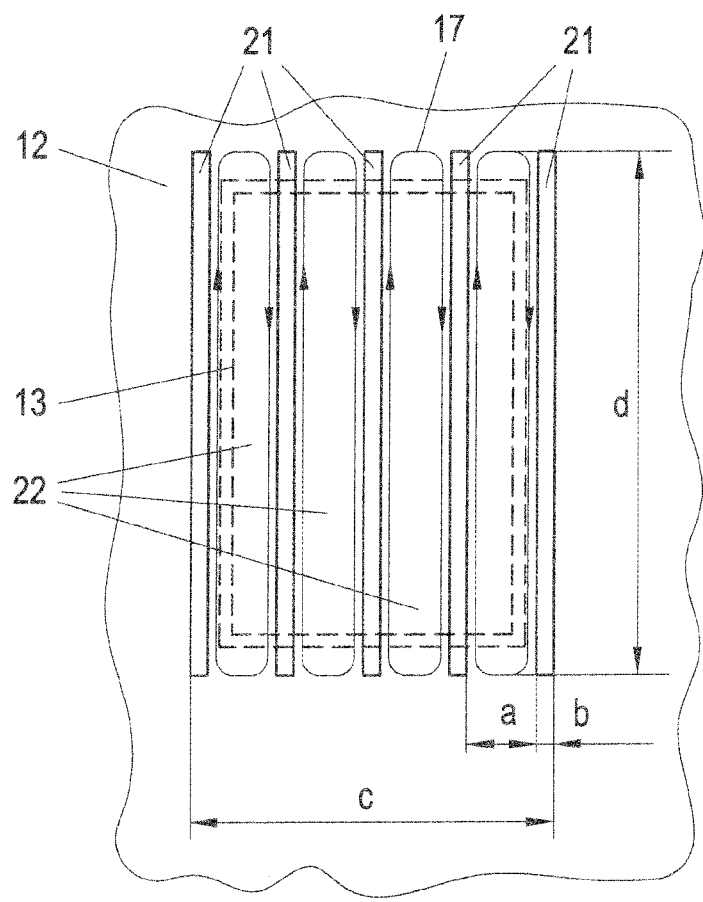
FIG. 4 shows the formation of eddy currents in one preferred housing wall according to the invention.

Sufficient suppression of the eddy current induction can be achieved, however, if the planar structure of the metallic housing 11, 12, at least in the region of the inductive antenna 13, is fashioned such that eddy currents 17 can no longer form therein or can only form therein to a very restricted extent. The simplest way of making this possible is by means of the configuration of slots 21 in the metallic housing wall 11 in the region of the antenna 13, as illustrated in FIG. 4. Said slots 21 can be arbitrarily thin; it is only necessary to attain a sufficient increase in the ohmic resistance in the transverse direction with respect to the slots, as is illustrated schematically in FIG. 4.

On account of the slots in the metal, the induced eddy currents 17 cannot propagate in an unimpeded manner (FIGS. 3 and 4). Eddy current induction occurs, of course, in the individual webs 22 between the slots 21. On account of the comparatively small web width a, current paths having through-flow in opposite senses lie close to one another and compensate one another with regard to the mutual induction effect of the eddy currents. The mutual induction effect is attenuated further by selection of a small web width a. The housing wall 12 becomes all the more permeable to the magnetic field generated by the antenna 13, the smaller the web width a is chosen to be.

If that region of a metallic device housing which covers the coil antenna 13 is provided with slots 21 as shown above, the magnetic field generated by the coil antenna 13 is also no longer attenuated, or is only slightly attenuated, with the result that wireless communication by inductive coupling through the metal housing 12 is possible.

Since the slot width b can be made very small without reducing the desired effect, there is also the possibility of obtaining a water-tight or largely air-tight cover (FIG. 9) despite the slots 21, for example by the housing wall 12 being coated with electrically non-electrically conductive materials. In this case, an electrically non-conductive material applied to the housing wall 12 bridges the slots 21, each having only a very small slot width b.

FIGS. 5 to 8 show examples of slotted areas 26 which are arranged in housing walls 12 and which permit an inductive coupling through the housing wall 12. The slots 21 are illustrated in each case only as lines.

Figure 5:
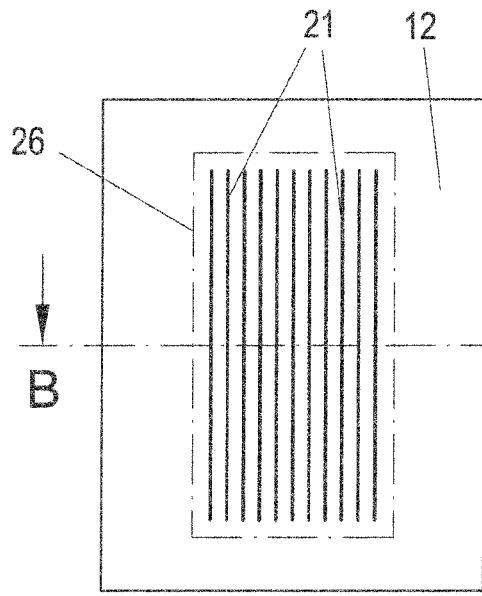
FIGS. 5 to 8 show preferred housing walls according to the invention.
Figure 6:
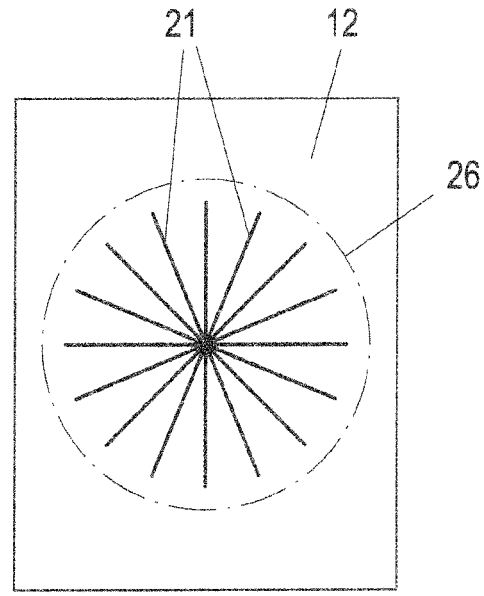
Figure 7:
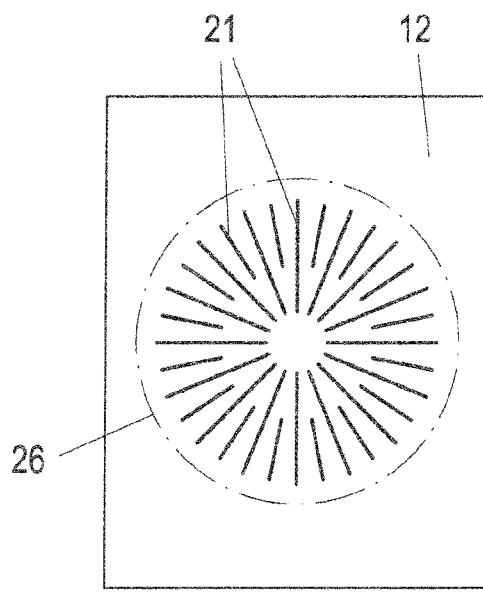
Figure 8:
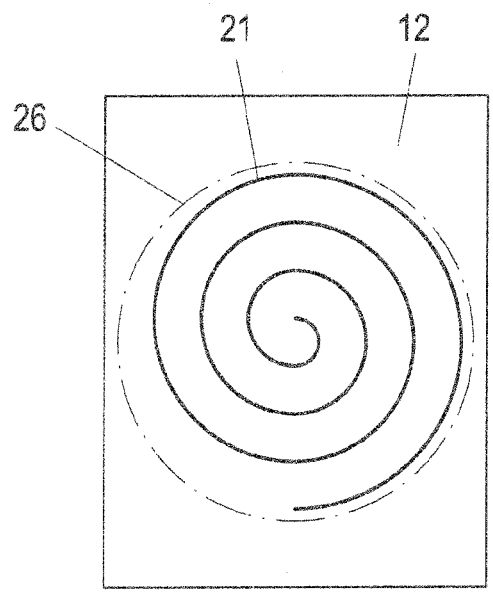
Figure 9:
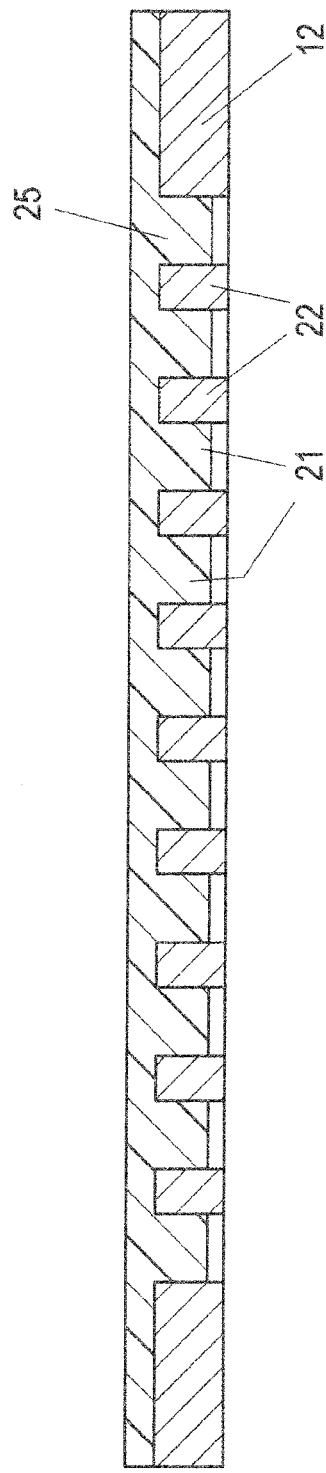
FIGS. 9 and 10 show preferred developments of the housing wall illustrated in FIG. 5 in cross section.
Figure 10:
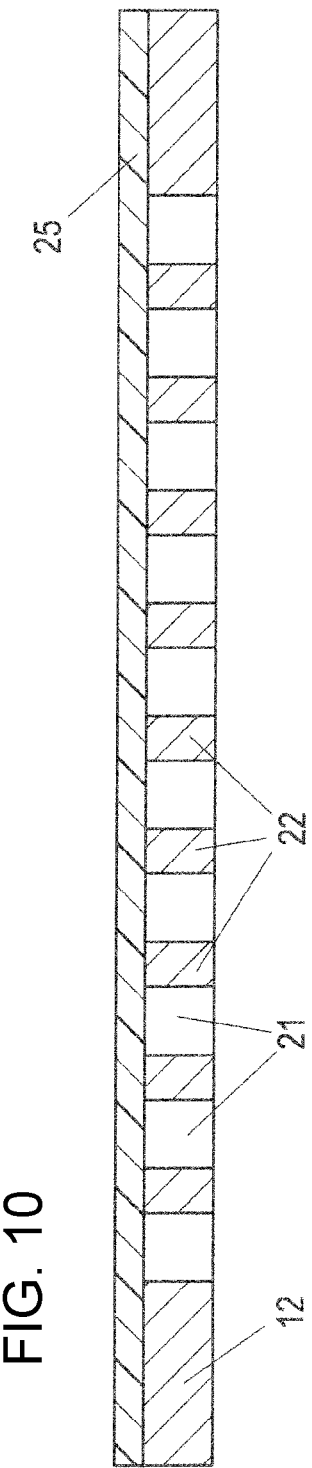

FIGS. 9 and 10 illustrate preferred embodiments of the invention, showing a cross section of the housing wall 12 along the sectional edge B-B from FIG. 5. It is particularly advantageous here for the housing wall 12 provided with slots 21 to be filled with an insulating layer 25 comprising electrically non-conductive or magnetically impermeable material. In this case, either the webs 21 can be filled with an insulating layer 25 composed of electrically non-conductive material 25. However, as illustrated in FIGS. 9, 10, it is also possible only to provide an additional insulating layer 25 comprising non-conductive material that prevents water or gases from penetrating through the housing wall 12.

A metallic device housing wall 12 having slots 21 has in practice poorer mechanical properties, for example lower bending stiffness, and poorer radio engineering properties in the UHF or microwave range. This last is primarily caused by the fact that slots 21 in metal structures can act very efficiently as antennas if the length of the slots 21 is in the range of the wavelength. For the frequency bands of a few hundred MHz to a few GHz that are used by modern cellular phones 1, this could accordingly indeed be the case, as a result of which the radio engineering properties of the cellular phones 1 are adversely impaired by the slots 21 in the device housing under certain circumstances.

Both of the abovementioned potential disadvantages of the slots 21 in the device housing 11, 12, namely possible influences of the mechanical and radio engineering properties, can be sufficiently reduced, however, by the housing wall 12 which is under consideration or that region of the housing wall 12 which is under consideration being constructed from two plies 23, 24 of slotted metal electrically insulated from one another, wherein the slots 21 of the two plies 23, 24 are arranged in a manner offset relative to one another. In order to achieve a bending stiffness similar to that of unslotted metal, an orthogonal offset with force-locking electrically non-conductive connection, in particular adhesive bonding, proves to be expedient. This is not absolutely necessary, however, for the magnetic transparency of the housing wall 12.

Figure 11:
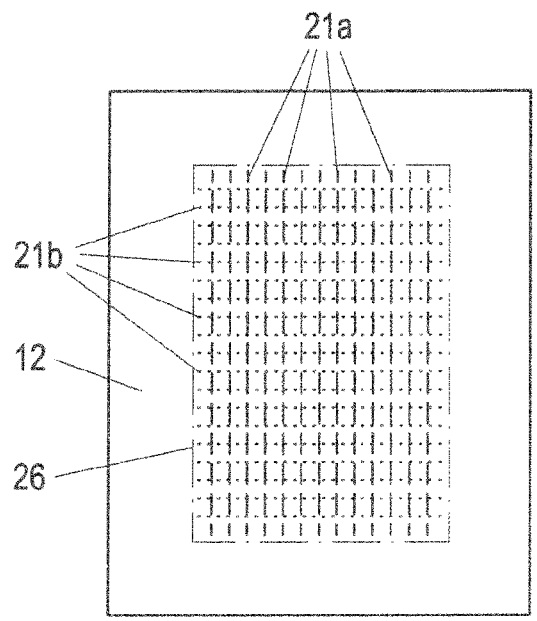
FIGS. 11 to 13 show preferred two-ply housing walls.
Figure 12:
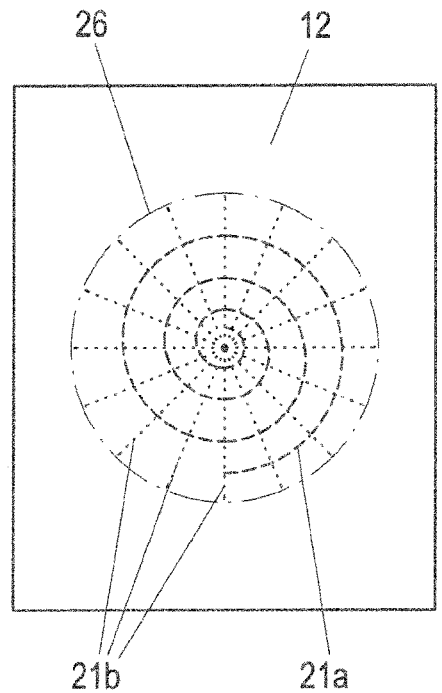
Figure 13:
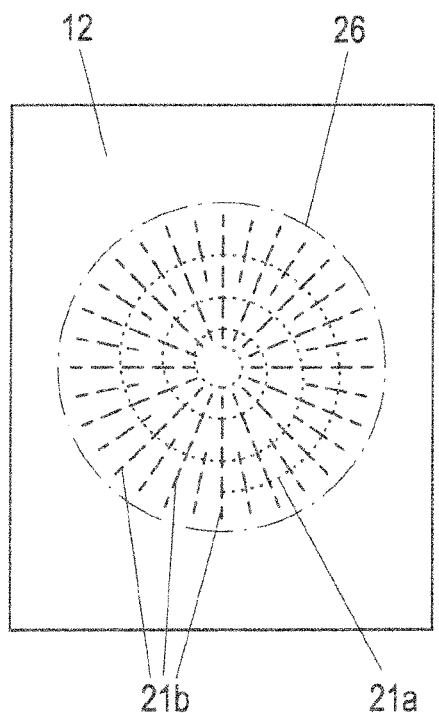

FIGS. 11 to 13 show examples of housing walls 12 with arrangements of two metal layers which are arranged one above the other but in a manner electrically insulated from one another and which sufficiently suppress a mutual induction effect and thus enable inductive communication through the housing wall 12.

Figure 15:
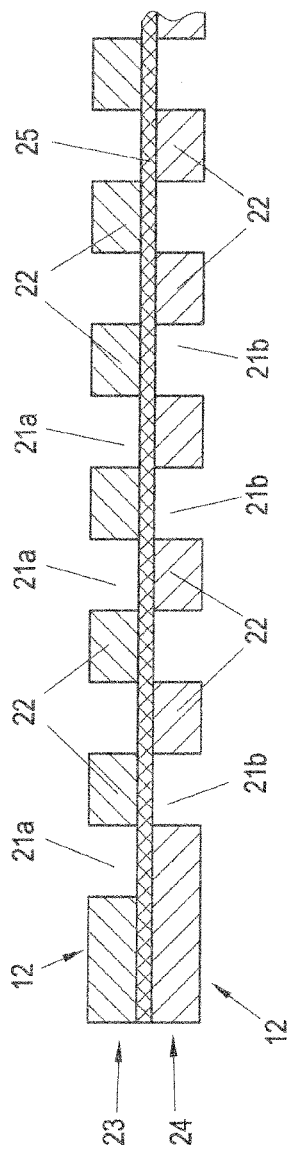

FIGS. 11 to 13 illustrate a plurality of embodiments of housing walls 12 comprising two-ply slotted areas, wherein the slots 21*a* illustrated in a dashed manner are present in the first ply 23 (FIG. 15) and the slots 21*b* illustrated in a dotted manner are present in the second ply 24 (FIG. 15).

Figure 14:
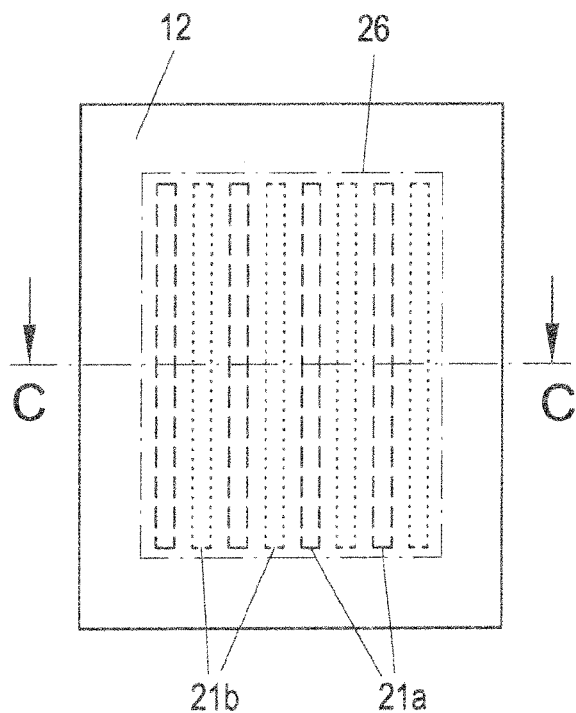
FIGS. 14 and 15 show a further two-ply embodiment of a housing wall in front view and in section.

The antenna effect caused by slots 21, particularly in the UHF and microwave range, can also be suppressed with two plies 23, 24 of slotted metal layers electrically insulated from one another in an arrangement in accordance with FIGS. 14 and 15.

FIG. 14 shows such an embodiment, with FIG. 15 showing a section C-C in FIG. 14. An insulating layer 25 is illustrated here, which insulates the two plies 23, 24 from one another and prevents liquids from penetrating through the housing wall 12.

Typical antennas 13 are designed for inductive data transmission in the frequency range of between 10 kHz and 100 MHz, in particular 120-135 kHz, 13-14 MHz, 25-30 MHz.

The mutual induction effect is locally influenced primarily by the web widths a or slot spacings. The smaller the web widths a, the better the mutual induction effect is suppressed. In practice, web widths a having a value of at most 3 mm appear to be expedient.

For unrestricted operation of inductive data communication, wherein communication is possible with all transponder sizes, as would also be the case in the case of a non-metallic housing, the dimensions of the slotted area 26, in particular the rectangular area having the size of the slotted area length d×the slotted area width c, are defined as larger than the external dimensions of the coil antenna 13. The slotted area 26 projects beyond the coil antenna 13. If the slotted area 26 is smaller than the external dimensions of the coil antenna 13 of the cellular phone, then communication is at least still possible with transponders whose transponder antenna is smaller than the slotted area 26.

Figure 16:
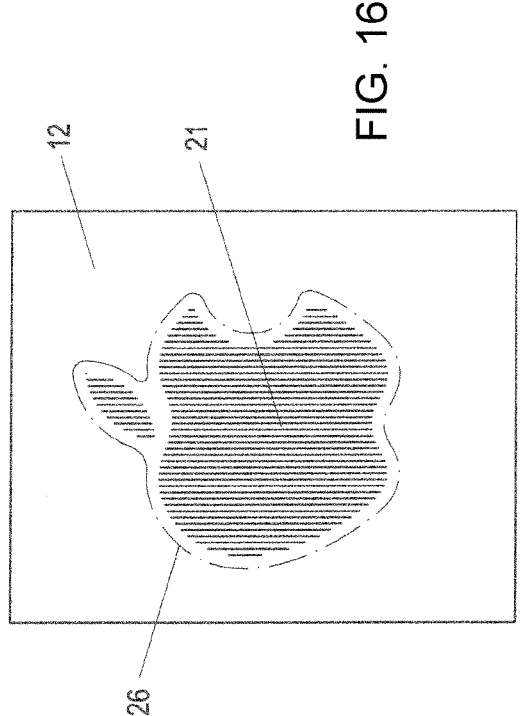
FIG. 16 shows a further advantageous embodiment of a housing wall, in which the slotted area is used as a design element.

It is also possible, of course, for the slotted area 26 to be fashioned such that at the same time it also fulfills advertising or brand identity or marketing purposes (FIG. 16).

The invention claimed is:

1. A housing wall for a data communications device, the housing wall comprising:
    a metallic and electrically conductive main body including a region having a slotted area, said region having said slotted area being permeable to magnetic fields for inductively coupling-in signals for wireless communication;
    said region including at least one first ply and at least one second ply each having a plurality of slots formed within said slotted area;
    said slots of said at least one first ply and said slots of said at least one second ply being mutually offset in said slotted area; and
    an insulating layer formed between said at least one first ply and said at least one second ply, said insulating layer spacing said at least one first ply and said at least one second ply apart from one another and electrically insulating said at least one first ply and said at least one second ply from one another.

2. The housing wall according to claim 1, which further comprises electrically non-conductive material disposed in said region having said slotted area and closing the housing wall.

3. The housing wall according to claim 1, wherein said insulating layer covers and closes said slots.

4. The housing wall according to claim 3, wherein said slotted area is impermeable to air or water.

5. The housing wall according to claim 1, which further comprises a coil antenna having sides, one of said sides being disposed in said region having said slotted area.

6. The housing wall according to claim 5, wherein said slotted area projects beyond said coil antenna.

7. The housing wall according to claim 1, wherein said slots define webs therebetween having a width of at most 3 mm.

8. The housing wall according to claim 1, wherein said slots of said at least one first ply and said slots of said at least one second ply form angles of more than 45° with respect to one another.

9. The housing wall according to claim 1, wherein said slots of said at least one first ply and said slots of said at least one second ply form angles of more than 85° with respect to one another.

10. A housing for a data communications device, the housing comprising:
    a housing wall according to claim 1 defining a housing interior; and
    a coil antenna disposed in said housing interior and disposed in said region having said slotted area.

11. A cellular phone, comprising:
    a housing having a housing wall according to claim 1 defining a housing interior; and
    a coil antenna disposed in said housing interior and disposed in said region having said slotted area.

* * * * *